United States Patent
Hutzel (10) Patent No.: US 10,477,779 B2
(45) Date of Patent: Nov. 19, 2019

(54) BOTANICAL AIR FILTRATION SYSTEM AND METHOD

(71) Applicant: Purdue Research Foundation, West Lafayette, IN (US)

(72) Inventor: William Joseph Hutzel, Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 303 days.

(21) Appl. No.: 15/463,723

(22) Filed: Mar. 20, 2017

(65) Prior Publication Data
US 2017/0273256 A1 Sep. 28, 2017

Related U.S. Application Data

(60) Provisional application No. 62/311,703, filed on Mar. 22, 2016.

(51) Int. Cl.
*A01G 9/02* (2018.01)

(52) U.S. Cl.
CPC ................... *A01G 9/025* (2013.01)

(58) Field of Classification Search
CPC .......... A01G 9/025; A01G 9/24; A01G 9/022; A01G 9/246; Y60P 60/244; Y60P 60/24; Y02P 60/244; Y02P 60/24
See application file for complete search history.

(56) References Cited

U.S. PATENT DOCUMENTS

| | | | | |
|---|---|---|---|---|
| 3,908,385 A * | 9/1975 | Daniel | ................... | A01G 25/16 405/37 |
| 4,079,546 A * | 3/1978 | Huang | ..................... | A01G 7/00 47/58.1 R |
| 4,732,591 A * | 3/1988 | Tujisawa | ................ | A61L 9/122 131/231 |
| 4,959,084 A * | 9/1990 | Wolverton | ............. | B01D 53/84 210/602 |
| 5,089,036 A * | 2/1992 | Hawes | ................... | B01D 53/84 96/108 |

(Continued)

FOREIGN PATENT DOCUMENTS

| | | | | |
|---|---|---|---|---|
| EP | 1500883 A2 * | 1/2005 | ................ | F24F 3/16 |
| JP | 2014064517 A * | 4/2014 | ............. | A01G 9/025 |

(Continued)

OTHER PUBLICATIONS

Jung Chang-Hyun, WO-2014200192-A2 English translation (Year: 2014).*

(Continued)

*Primary Examiner* — Magdalena Topolski
(74) *Attorney, Agent, or Firm* — Hartman Global IP Law; Gary M. Hartman; Domenica N.S. Hartman

(57) ABSTRACT

A system and process for filtering air by removing pollutants from the air with living plants. The system includes an enclosure, a wall within the enclosure on which living plants are supported and grow in one or more horizontal plant beds defining vertical tiers along the wall, an irrigation system for watering the plants, and a lighting system for simulating sunlight. Air moving through the enclosure flows adjacent leaves of the plants, through a growth media in the plant bed, and then out of the enclosure.

20 Claims, 10 Drawing Sheets

3D - Model

Air flow principle

(56) References Cited

U.S. PATENT DOCUMENTS

| | | | | |
|---|---|---|---|---|
| 5,130,091 | A | * | 7/1992 | Saceman ................ A01G 9/00 422/4 |
| 5,180,552 | A | * | 1/1993 | Saceman ................ A01G 9/00 422/1 |
| 5,277,877 | A | * | 1/1994 | Jeffrey ................ A61L 9/122 47/66.6 |
| 5,315,834 | A | * | 5/1994 | Garunts ................ A61L 9/00 62/78 |
| 5,433,923 | A | * | 7/1995 | Wolverton ............ A61L 9/037 422/121 |
| 5,853,460 | A | * | 12/1998 | Alcordo ............ B01D 53/0407 96/134 |
| 6,006,471 | A | * | 12/1999 | Sun ................ A01G 9/18 47/69 |
| 6,197,094 | B1 | * | 3/2001 | Thofelt ................ B01D 53/84 95/211 |
| 6,727,091 | B2 | * | 4/2004 | Darlington ............ B01D 53/85 435/299.1 |
| 7,243,460 | B2 | * | 7/2007 | Darlington ............ A01G 31/02 47/59 S |
| 9,010,019 | B2 | * | 4/2015 | Mittelmark ............ F24F 3/16 47/66.7 |
| 9,032,665 | B2 | * | 5/2015 | Whitney ............ A01G 31/02 47/59 R |
| 9,445,557 | B2 | * | 9/2016 | Darlington ............ A01G 31/02 |
| 2008/0044892 | A1 | * | 2/2008 | Wu ................ B01D 53/84 435/292.1 |
| 2011/0154985 | A1 | * | 6/2011 | Mittelmark ............ A01G 27/00 95/1 |
| 2013/0227884 | A1 | * | 9/2013 | Park ................ B01D 53/84 47/66.6 |
| 2015/0237811 | A1 | * | 8/2015 | Marquez ................ A01G 9/023 47/66.6 |
| 2015/0264871 | A1 | * | 9/2015 | Finnerty ................ A01G 9/18 47/62 A |
| 2015/0289452 | A1 | * | 10/2015 | Axley ................ F28C 3/06 47/66.6 |
| 2016/0295809 | A1 | * | 10/2016 | Huang ................ A01G 13/08 |

FOREIGN PATENT DOCUMENTS

| | | | | |
|---|---|---|---|---|
| JP | 2014138577 | A | * 7/2014 | ............ A01G 9/025 |
| JP | 2014195423 | A | * 10/2014 | ............ A01G 9/025 |
| JP | 6169391 | B2 | * 7/2017 | ............ A01G 9/025 |
| WO | WO-8501647 | A1 | * 4/1985 | ............ A01G 9/246 |
| WO | WO-2014200192 | A2 | * 12/2014 | ............ A01G 9/025 |
| WO | WO-2015045087 | A1 | * 4/2015 | ............ A01G 9/025 |

OTHER PUBLICATIONS

Darlington, A. and Dixon, M. [2002], 'Acclimation and nutrition of indoor air biofilters', Proceedings: Indoor Air. Air Quality Solutions Ltd., Naturaire Systems.

Cho, J., Mansfield, J. and Krockenberger, K. [2013], 'Using plants to reduce energy: Evaluation of energy, indoor air quality, and biofiltration performance of a biowall', The Journal of Purdue Undergraduate Research 3(1), 5.

Rodgers, K. L., Hutzel, W., Dana, M. and Handy, R. [2012], 'Can plants save money: a look at the biowall', International high performance buildings conference . Purdue University.

Curtis, L. and Stuart, M. [2010], 'Enhancing chbe indoor air quality: Biowall technology'. University of British Columbia.

Newkirk, D. W. [2014], Improving indoor air quality through botanical air filtration in energy efficient residences, Master's thesis, Purdue University.

\* cited by examiner

Soaker hose in tray

FIG. 8

Tray in plenum

BOTANICAL AIR FILTRATION SYSTEM AND METHOD

CROSS REFERENCE TO RELATED APPLICATIONS

This application claims the benefit of U.S. Provisional Application No. 62/311,703, filed Mar. 22, 2016, the contents of which are incorporated herein by reference.

STATEMENT REGARDING FEDERALLY SPONSORED RESEARCH

This invention was made with government support under Grant No. SU-83573001-0 awarded by the Environmental Protection Agency. The government has certain rights in the invention.

BACKGROUND OF THE INVENTION

The present invention generally relates to indoor air conditions. The invention particularly relates to botanical air filtration systems and methods suitable for use in buildings and other enclosed spaces.

Tightly sealed buildings have a tendency to suffer from poor air quality, often from the buildup of various pollutants. Major pollutants are usually categorized to be inorganic, organic or biological. Typical inorganic and organic indoor air pollutants include, but are not limited to, tVOC, formaldehyde, toluene, carbon dioxide, carbon monoxide, nitrogen dioxide, and sulfur dioxide. Research into indoor air quality particularly focuses on volatile organic compounds (VOCs), which are a group of 50-300 different chemical substances that are organic and volatile at room temperature with a vapor pressure greater than 0.074 mmHg at 20° C. and can be divided in aldehydes, alcohols, aliphatic hydrocarbons, halogenated hydrocarbons and ketones. Indoor sources for common VOCs include, but are not limited to, commercial products like cleaning liquids, hobby supplies, cosmetics, paintings, adhesives, furniture, building materials, emissions, and tobacco smoke. Biological contaminants mainly include viruses, bacteria, fungi, and mold spores which either grow indoors or are supplied by fresh outdoor air.

Poor indoor air quality can have significant negative effects on individuals. Methods for improving indoor air quality are generally based on limiting the concentration of pollutants involve maximizing ventilation rates and air distribution, removing pollutant sources, and/or cleaning (filtering) the air. A current solution to poor indoor air quality is dilution of the indoor air with outdoor ventilation air, for example, by combining recirculated air with about twenty percent outdoor ventilation air. Units for this purpose include what are referred to as energy recovery ventilators (ERVs), which draw fresh air from outside a building and exhaust air from inside the building, and exchange energy between the two streams to precondition the incoming fresh air. The cost of heating or cooling the outdoor ventilation air can represent between 10 and 20 percent of the total energy consumption of a building. Alternatively or in addition to air ventilation, filtration methods may be used to remove pollutants from the air. Filtration is a physical pollutant removal mechanism commonly used to clean indoor air in commercial heating, ventilation, and air conditioning (HVAC) systems. Various methods of filtering air are well known in the art. However, filtration systems may be expensive to operate and, even with the use of current filtration systems, air ventilation is often still needed to provide suitable indoor air quality.

In view of the above, it can be appreciated that there is an ongoing desire for systems and methods for improving indoor air quality, particularly systems and methods that have reduced energy and operation costs.

BRIEF DESCRIPTION OF THE INVENTION

The present invention provides botanical air filtration systems and methods suitable for use in buildings and other enclosed spaces.

According to one aspect of the invention, a botanical air filtration system is provided that includes an enclosure, a wall within the enclosure on which living plants are supported and grow in one or more horizontal plant beds defining vertical tiers along the wall, an irrigation system for watering the plants, and a lighting system for simulating sunlight. Air moving through the enclosure flows horizontally and vertically and travels adjacent leaves of the plants, through a growth media in the plant bed, and then out of the enclosure.

Another aspect of the invention includes integrating the enclosure of the above-noted botanical air filtration system with an HVAC system of a building so that return air from the building is drawn through the enclosure to remove pollutants with the plants.

According to another aspect of the invention, a method of using a botanical air filtration system includes drawing air through an enclosure of the botanical air filtration system. The enclosure has a wall within the enclosure on which living plants are supported and grow in one or more horizontal plant beds defining vertical tiers along the wall, and the air drawn through the enclosure flows adjacent leaves of the plants, through a growth media in the plant bed, and then out of the enclosure. The method includes watering the plants with an irrigation system of the botanical air filtration system, and simulating sunlight for the plants with a lighting system of botanical air filtration system.

Technical effects of botanical air filtration systems of a type described above preferably include the ability to improve air quality and reduce energy consumption by employing plants to filter air within a building or other enclosed space, and preferably to do so in an effective, efficient, and aesthetic manner, particularly if the system is located or otherwise visible within a living space.

Other aspects and advantages of this invention will be further appreciated from the following detailed description.

DETAILED DESCRIPTION OF THE INVENTION

This disclosure provides botanical air filtration systems and methods capable of improving indoor air quality. Botanical air filtration is defined herein as plant-assisted biofiltration which can be described as a hybrid technology between biofiltration (e.g., wherein contaminated air is guided through an either open or closed reactor containing an organic filter bed) and phytoremediation (removal or storage of environmental contaminants from air, water, soil, and/or sediments with the use of plants). The main difference between botanical air filtration systems and regular biofilters are the integration of green plants which boost the removal performance of the filter by providing rhizosphere microorganisms. It is believed in such systems that both the root zone and aerial parts of the plants are important for contaminant removal.

Removal mechanisms for direct phytoremediation can be classified as phytoextraction, rhizofiltration, and phytostabilization. Phytoextraction describes the uptake of contaminants by plant roots and their distribution in harvestable parts of the plant. Rhizofiltration describes the processes of adsorption onto plant roots and the absorption into the roots of contaminants in water solution to immobilize and accumulate them. Due to the ongoing accumulation of contaminants inside plants, the plant size increases over time. In contrast to phytoextraction, phytostabilization is the process of adsorption of contaminants onto the root zone and the following accumulation in the soil around plant roots rather than the plant. To fully remove the accumulated contaminants, plants and the soil need to be replaced regularly, which can result in a following relieve of the accumulated contaminants from dead plants.

Hence, indirect phytoremediation mechanisms, such as rhizodegradation and phytodegradation, are in primary focus of botanical air filtration due to their abilities to remove contaminants by converting them to harmless products like $CO_2$, water, and biomass. Rhizodegradation describes the ability of microorganisms in the plants rhizosphere to convert and breakdown organic contaminants in soil. The microorganisms use organic contaminants as a carbon source to grow their population, which increases also the removal capacity. The conversion and breakdown of organic contaminants by plant released substances, such as enzymes, is called phytodegradation. The performance of phytoremediation predominantly depends on the contaminant-plant-microorganism interaction. To ensure functioning phytoremediation mechanisms, an environment needs to be established where plants can stay healthy and are able to grow. To maintain plant health, limitations need to be observed in terms of humidity, air circulation, light conditions, water availability and soil characteristics. The amount of microorganisms in the rhizosphere of the plant depends on the plant health too, because only healthy plant roots release sugars, amino acids, aliphatics, aromatics, and enzymes to feed microorganisms and ensure their growth.

The performance of phytoremediation also depends on characteristics of the contaminant. Especially contaminants with a good chemical water solubility, a high vapor pressure and small molecular size are easier to remove than others. Factors like the charge and lipophilicity play an important role as well. Furthermore, the soil needs to have the ability to absorb and accommodate contaminants and water and have a certain pH-value. The root zone distribution and the overall interfacial area strongly impact the performance of phytoremediation.

In order to take advantage of the above-noted pollutant removal mechanisms, botanical air filtration systems preferably pass air through the leaf and root zone of indoor plants. These plants may be arranged, for example, in potted plant applications or active botanical air filters, which operate as forced air systems. The botanical air filtration systems disclosed herein preferably include active botanical air filters capable of filtering air with living plants located in at least one container filled with a growth media.

The filtration systems preferably include lighting and water systems capable of maintaining the health and growth of the plants. Preferably, the plants are located in a container that is configured such that the plants and growth media define a plant bed that is substantially horizontal. During operation, air (referred to herein as "intake air") is drawn over the plant bed, past the plants, and through the growth media to remove contaminants, such as but not limited to hazardous chemicals, volatile organic compounds (VOCs), and carbon dioxide, and thereby improve air quality. As such, the filtration system preferably includes or is fluidically coupled to an auxiliary system that includes an air flow system capable of drawing the air through the plant bed. Air that has passed through the plant bed is referred to herein as "filtered air."

The filtration systems may include various structures, sizes, components, and functions depending on the specific application. For example, the system may be configured to filter air in one or more enclosed rooms, air in an entire building, or air passing through a larger apparatus. The filtration systems may be configured to provide filtered air that is conditioned for a specific purpose. For example, the filtration systems may be configured to produce filtered air having a relative humidity that is greater than or less than the relative humidity of the intake air. As a specific nonlimiting example, a filtration system could be located within a bathroom or restroom of a building and operated to filter and reduce the relative humidity of air within the restroom.

According to a nonlimiting embodiment of the present invention, the filtration systems may incorporate what will be referred to herein as a "biowall," which comprises an enclosure that contains a vertical wall in which living plants are supported and grown. Optionally, the enclosure can be comparable to a plenum or duct of a type used in a conventional heating, ventilation, and air conditioning (HVAC) system as an enclosed space for airflow. The enclosure is preferably oriented vertically so that the plants are arranged in vertical levels or tiers along the wall and air moves through each individual tier of the enclosure. The enclosure further contains an irrigation system for watering the plants, and a lighting system for simulating sunlight.

The biowall can be integrated with a building's HVAC system to remove contaminants that reduce indoor air quality. In this arrangement, return air from the building may be drawn through the plant-containing enclosure of the biowall as intake air, where pollutants (e.g., hazardous chemicals and carbon dioxide) are naturally removed by the plants. The resulting filtered air can then optionally be combined with outdoor ventilation air before being recirculated throughout the building using the ducts of the HVAC system. Investigations indicate that use of a biowall allows for the use of lower levels of outdoor ventilation air as compared to conventional ERV systems, for example, as low as about 5 percent outdoor ventilation air and potentially lower, in comparison to about 20 percent outdoor ventilation air of conventional systems, while achieving similar levels of air quality. Due in part to a reduction in the need to condition ventilated outdoor air, filtration systems comprising a biowall have the potential to reduce energy consumption, for example, by up to 15 percent and potentially greater.

The biowall may be used in combination with custom humidity control strategies to beneficially influence moisture levels in a building. In particular, the biowall contributes moisture to the filtered air that is beneficial during the heating season and in arid climates due to evaporation from watering of the plants. In addition, the biowall can reduce moisture levels in a relatively high moisture area, such as a bathroom or other location that experiences a high latent load. Consequently, dehumidification and/or humidification systems used in combination with the biowall are preferably controlled to take into consideration the biowall's impact on moisture levels.

Figure 1:
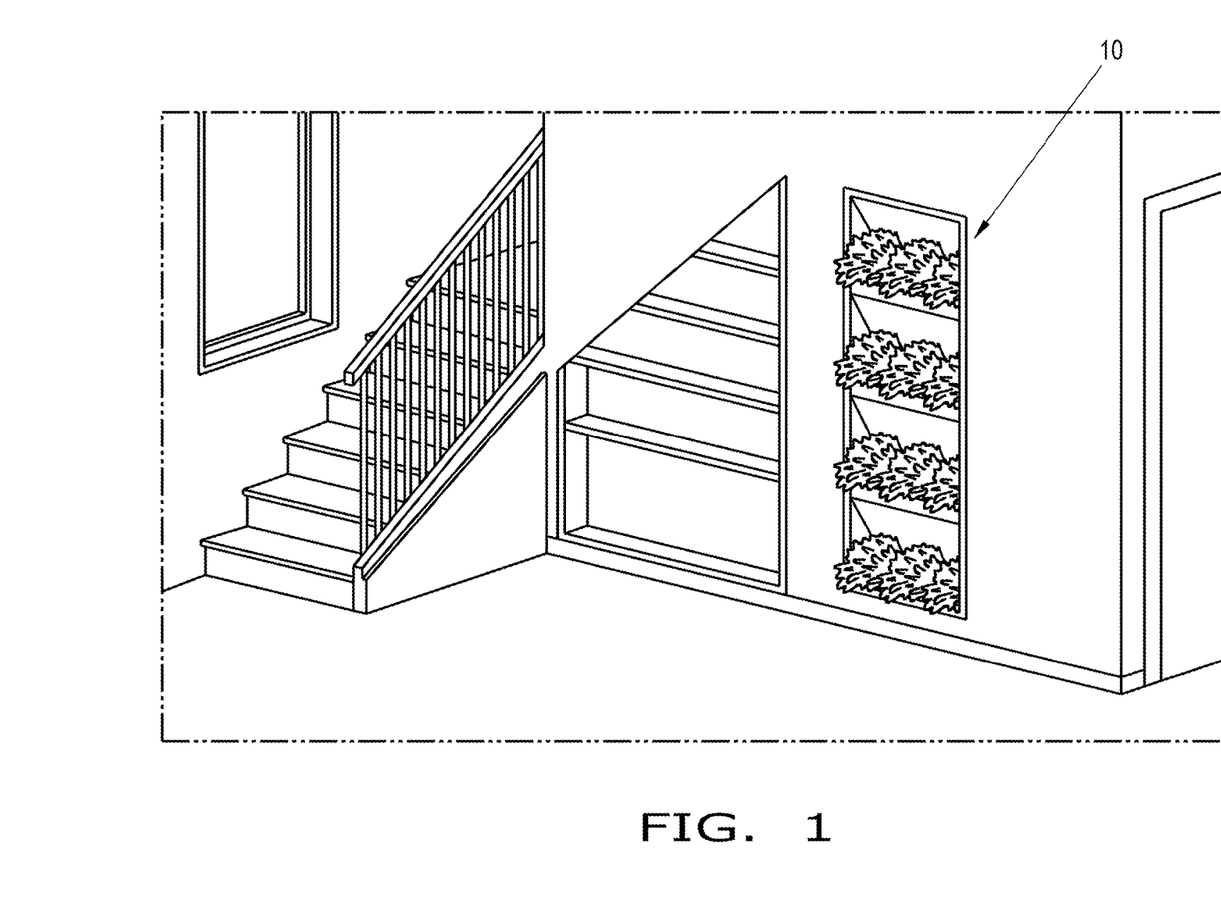
FIG. 1 represents a botanical air filtration system installed in a residential building in accordance with a first nonlimiting embodiment of the invention.
Figure 2:
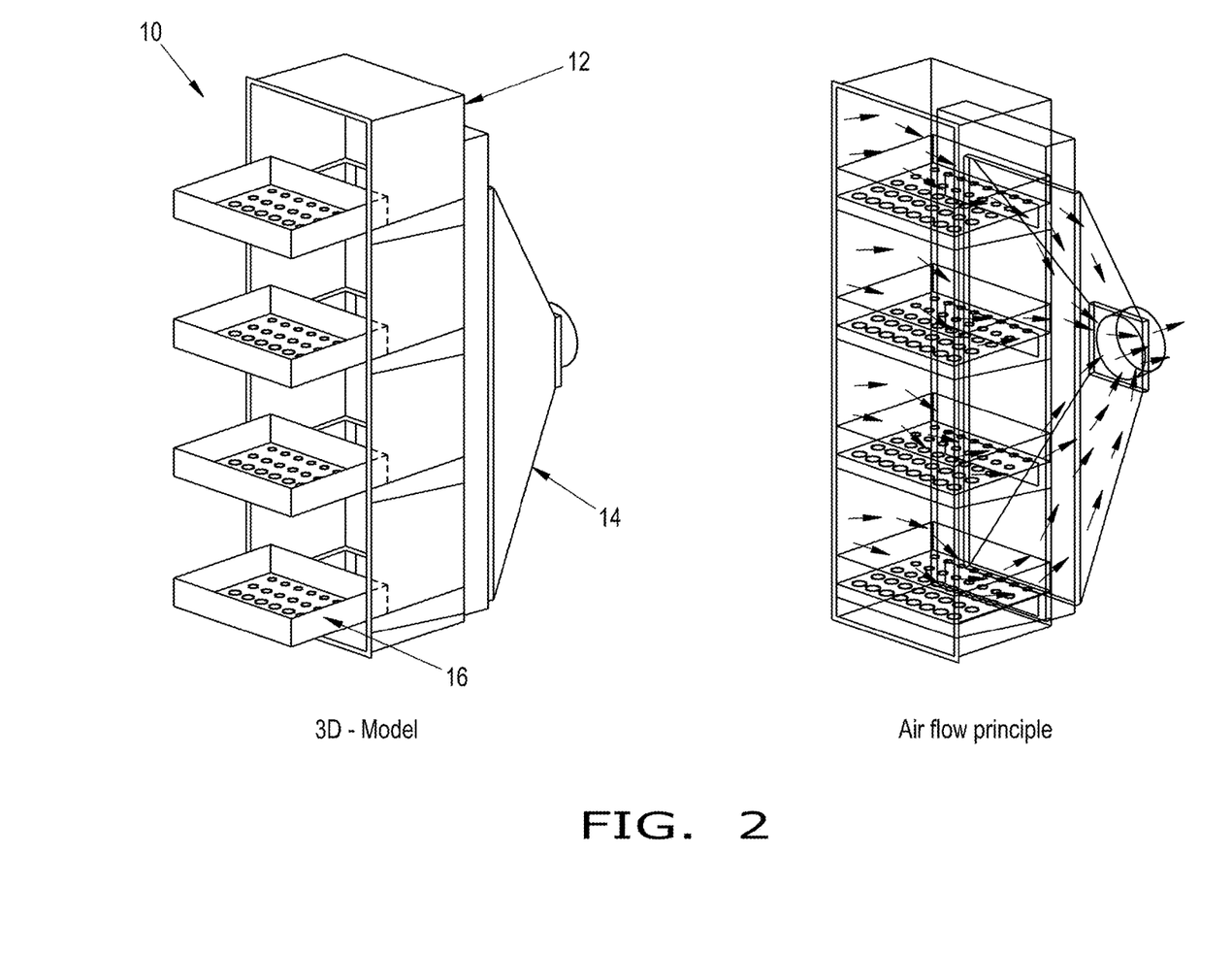
FIG. 2 represents a biowall of the botanical air filtration system of FIG. 1, with trays pulled out for clarity (left) and air flow patterns therethrough (right).

FIG. 1 represents a nonlimiting embodiment of a biowall 10 which includes four plant filter beds arranged one above the other at four filter levels or tiers to achieve an overall filter area. Each filter bed and its plants are located in a modularized tray 16 installed in one of the four filter tiers, and each filter bed is preferably removable to enable plant and growth media maintenance. As represented in FIG. 2, the four removable trays 16 fit into a plenum 12. A backduct 14 is located behind the plenum 12 and draws air through the plenum 12 ands its trays 16. As evident from FIG. 1, the backduct 14 can be hidden in a wall, closet, or utility area. As represented in FIG. 2 (right), air flow through each tier is preferably a combination of horizontal and vertical flows across and through plants (not shown in FIG. 2) located in each tray 16, and the backduct 14 is configured to combine the individual air flows (indicated with arrows) from the plant filter beds into a single outlet including a fan which draws air flow through the biowall 10. The structure focuses on applying symmetries to the backduct 14 which preferably promotes equal air flow through every filter tier. To enable vertical flow through the horizontal filter beds and plants' rhizospheres, the trays 16 are equipped with holes (50 in FIG. 6) on the bottom surface thereof so that the backduct 14 is able to draw air downward through each tray 16 and through the plants and growth media (not shown in FIG. 6) contained therein.

Figure 3:
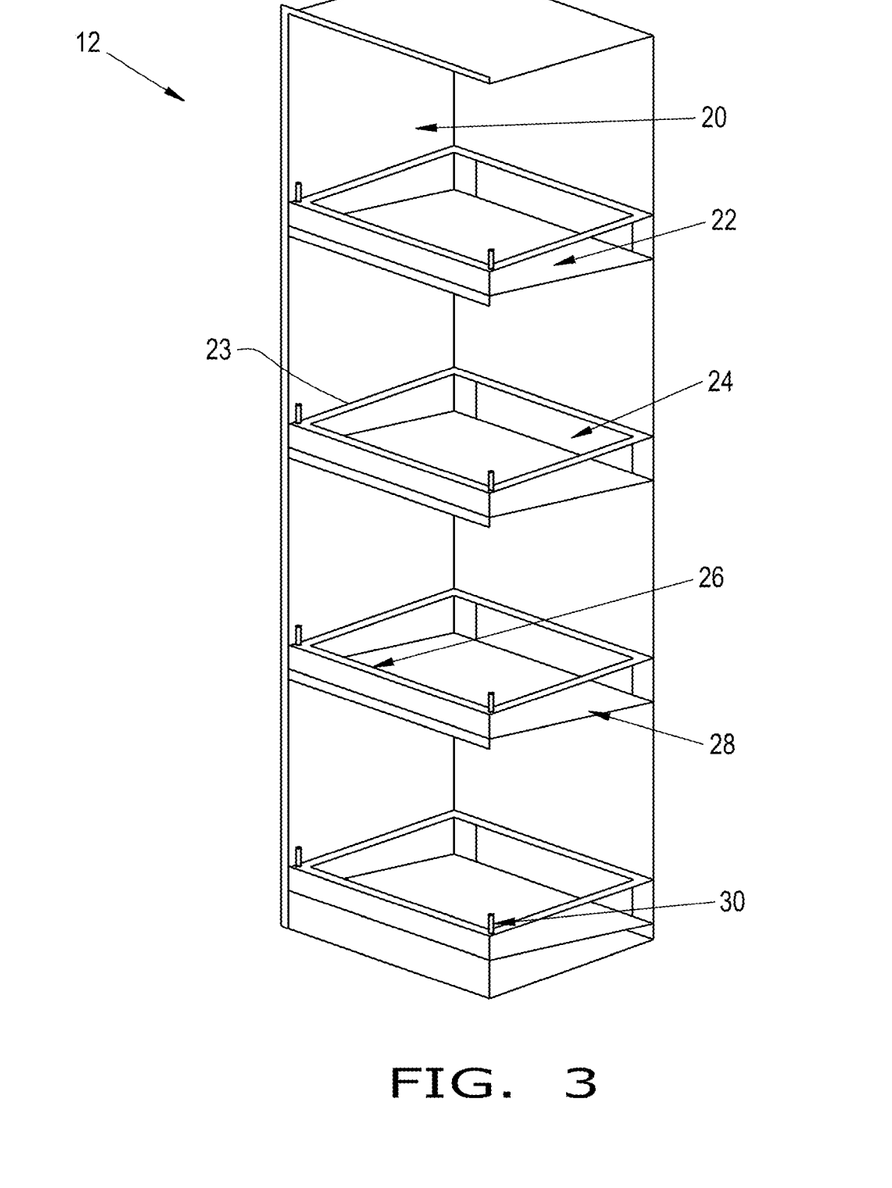
FIG. 3 represents a vertical cross-sectional view of a plenum 12 of the biowall of FIG. 2.

FIG. 3 represents a vertical cross-sectional view of the plenum 12 of FIG. 2. The plenum 12 accommodates the trays 16 with the filter bed and plants therein (not shown in FIG. 3) and supports the backduct 14 (not shown in FIG. 3) on a back side thereof. A front side of the plenum 12 is open to display the trays 16 and provide access for incoming air to each individual tray 16. Preferably, the plenum 12 includes equal sized spaces 20 for each tray 16 and its plants. Between these spaces 20, air chambers 22 are provided to receive the downward flowing air that has vertically passed through the trays 16 and guide the air to individual air chamber outlets 24 at a back wall of the plenum 12 through which the air passes and enters the backduct 14. Supports 23 may be are located at every air chamber 22 to carry the weight of the trays 16. The supports 23 are preferably made of suitably strong and corrosion-resistant material, such as stainless steel, to avoid displacement of the material due to high mass loads. A sealing material (not shown), such as a foam tape gasket, may be secured at a top side of each support 23 to promote the flow of incoming air through the filter beds rather than bypassing the filter beds between edges of the beds and the supports 23. The air chambers 22 are closed on the bottom side with an angle plate 28 which slopes to direct drainage water from the tray 16 above to the air chamber outlet 24 associated with the tier. Two fasteners 30 may be secured at every support 23 to hold the plant trays 16 in position.

Figure 4:
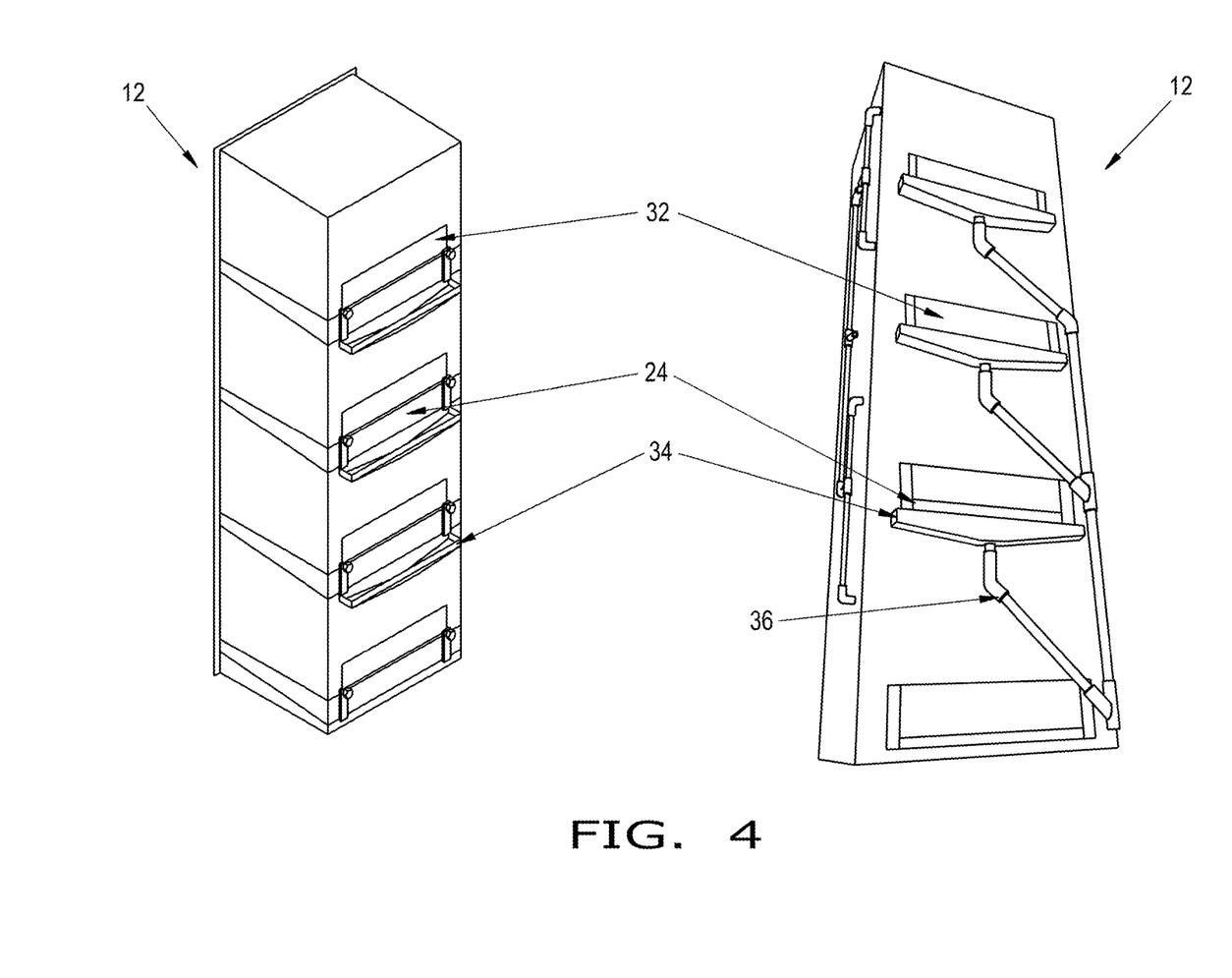
FIG. 4 represents a rear view of the plenum of FIG. 3 and a scanned image showing a rear view of a prototype of the plenum.

FIG. 4 depicts the back side of the plenum 12 (left) and an image of a prototype (right). Four air chamber outlets 24 are visible on the back side of the plenum 12. The three upper air chamber outlets 24 are equipped with individual drain trays 34 to allow an uptake of surplus water that may drain from the trays 16 during watering. Drain pipes 36 are therefore mounted to each of these drain trays 34 which direct the surplus water to a main drain 48 (FIG. 5) located at a lower end of the backduct 14. In this arrangement, the lowermost air chamber outlet 24 drains directly to the main drain 48; however, a drain pipe 36 could also be coupled thereto if desired. In order to promote an even distribution of air flow through the system, FIG. 4 further represents slide gates 32 located at the air chamber outlets 24 which allow for air flow adjustment. Preferably, each air chamber outlet 24 includes a guide rail that holds its slide gate 32 and allows for vertical movement of the gate 32 to adjust the cross-sectional area of the outlet 24, for example, the cross-sectional area of an air chamber outlet 24 can be reduced by lowering its slide gate 32. Fasteners may be provided on the guide rails to fix the positions of the slide gates 32. As such, the slide gates 32 and the configuration of the plenum 12 promote an equal air flow through each of the trays 16.

Figure 5:
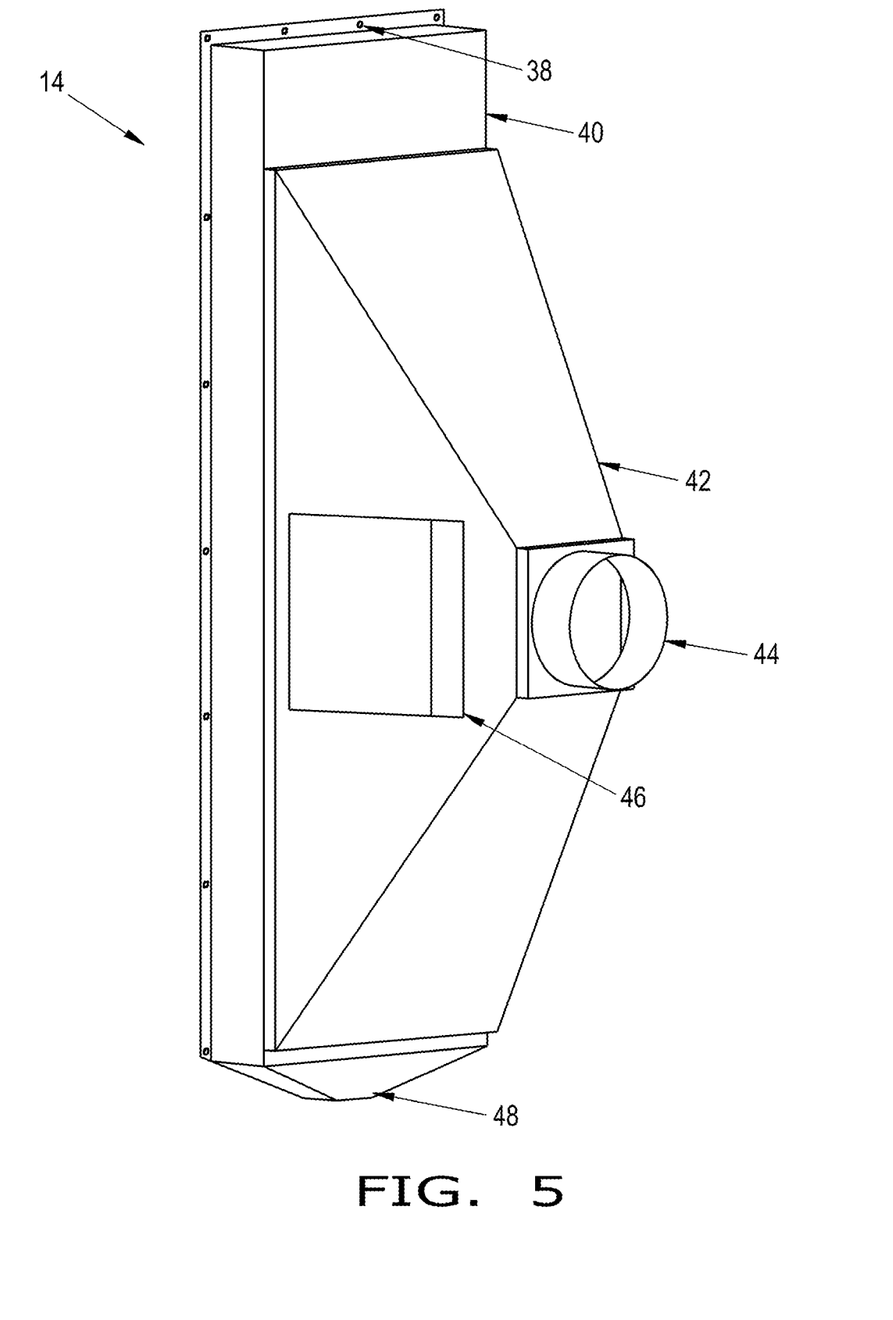
FIG. 5 is an isolated view of a backduct of the biowall of FIG. 2.

FIG. 5 represents an isolated view of the backduct 14 of the biowall 10 which is configured to provide a low-resistance air flow path from the individual air chambers 22 to a central outlet duct and further to a return of an HVAC-system (not shown). The backduct 14 includes a duct 42 which may be formed as a rectangular frustum and secured to a center component 40. The air flow through the system can be induced with an axial fan (not shown) located within or downstream of an exhaust hole 44 in the backduct 14. The backduct 14 is represented as having a substantially symmetric shape between the fan position and the air chamber outlets 24 in order to promote equal air flow conditions through each tier within the plenum 12. The duct 42 also contains a hole 46 for an air tight access door. Between the duct 42 and the plenum 12, the rectangular center component 40 provides space inside the backduct 14 for the slide gates 32, single drain trays 34, and the drain pipes 36. The main drain 48 may be located at the lowermost extent of the center component 40. The center component 40 may include mounting holes 38 to secure it to the plenum 12 with fasteners. To ensure a watertight and airtight fit, a metal lip is located around the center component 40 and may include a sealing material (not shown), such as a foam tape gasket.

Figure 6:
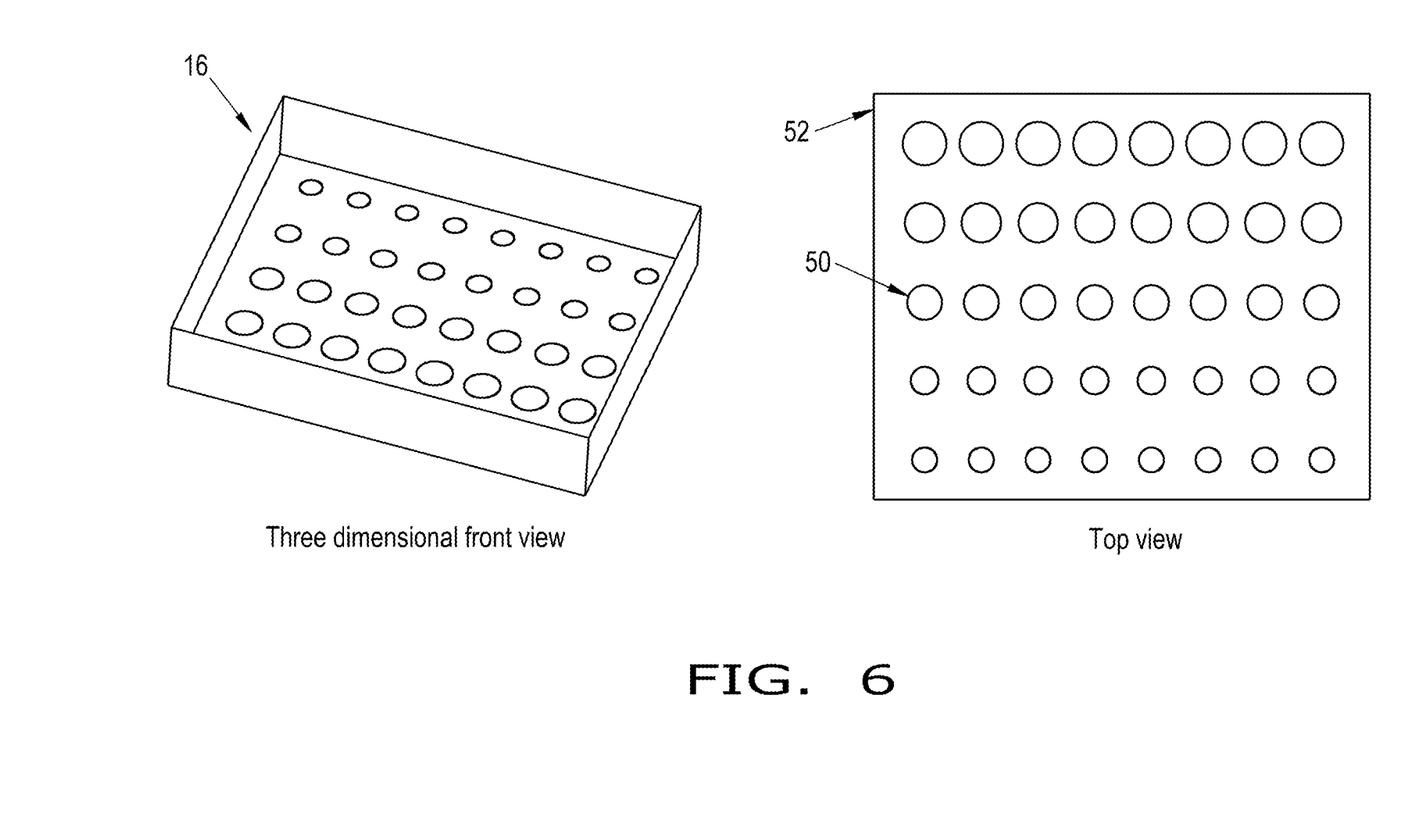
FIG. 6 includes perspective and top views of a tray of a type suitable for use in the biowall of FIG. 2.
Figure 8:
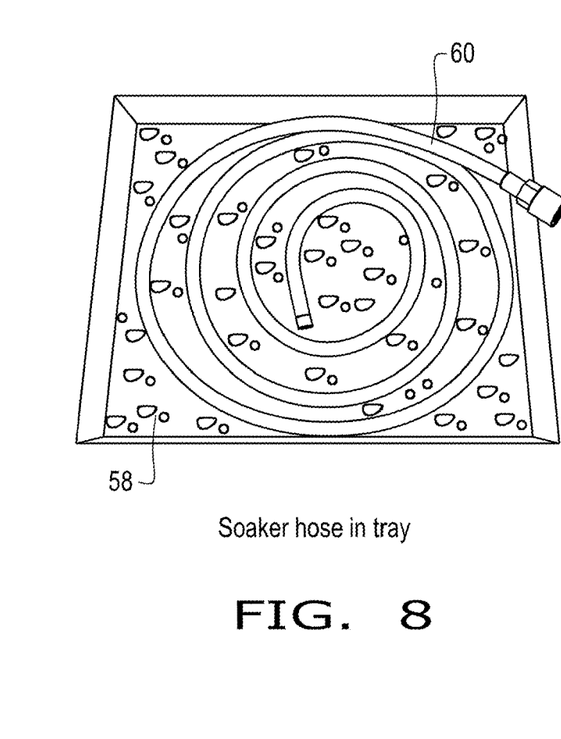
FIG. 8 represents a soaker hose located in the tray of FIG. 7 prior to being covered by the growth media.

The trays 16 may have any shape, but are preferably rectangular boxes which accommodate the growth media, plants, and a water distribution system (e.g., soaker hoses 60 in FIG. 8). FIG. 6 depicts a tray 16 and and a pattern of holes 50 formed in the bottom thereof. As previously noted, the holes 50 allow air to flow vertically through the growth media and plant rhizosphere. The hole pattern is also configured to promote a uniform air flow across the surface of the tray 16, which is provided by a decreasing diameter of the holes 50 from the front to the back of the tray 16. A stainless steel mesh (not shown) may be located inside the tray 16 to cover the holes 50 and reduce the likelihood that the growth media can fall out through the holes 50 and accumulate in the air chamber 22 therebelow. The trays 16 may include mounting fixtures 52 to hold them in position in the plenum 12. For example, two holes may be located in a bottom of the trays 16, which are configured to mate with the fasteners 30 on the plenum 12. The holes may be covered with sleeves or otherwise sealed at the inside of the tray 16 to prevent water leakage.

Figure 7:
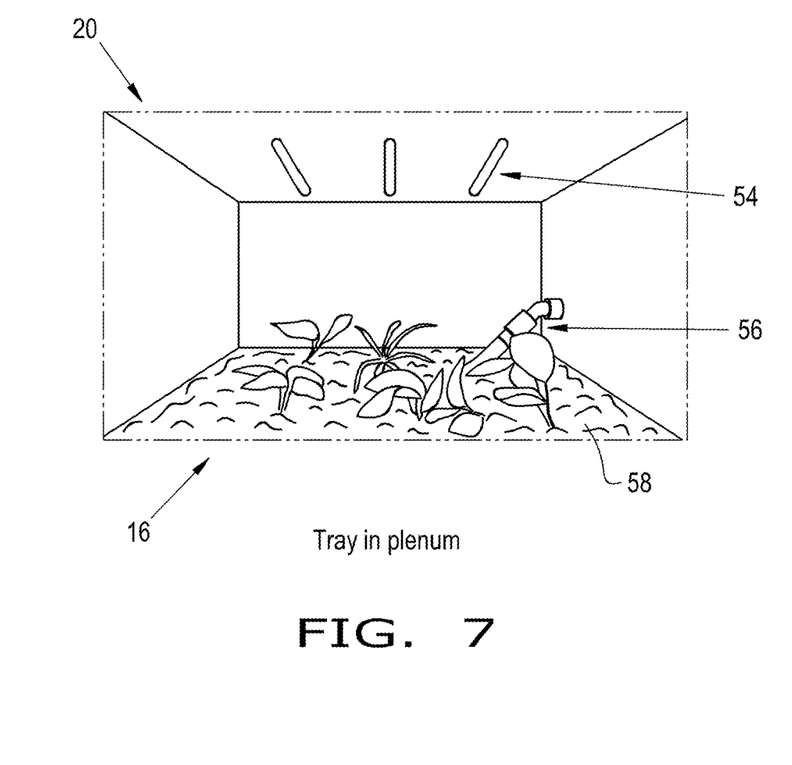
FIG. 7 represents plants located in growth media contained by a tray and located at one tier of the biowall of FIG. 2.

To promote an even water distribution inside the trays 16, a low volumetric flow rate combined with a plane drip irrigation may be used. Therefore, soaker hoses 60 may be located within growth media 58, for example, in a spiral pattern as represented in FIG. 8. One end of the soaker hose 60 is preferably sealed with an end cap and the other end may be equipped with a connector for receiving water from a suitable water supply. The connector is shown in FIG. 7 as being mated with a corresponding adapter at a water connection point 56 within the plenum 12. This allows for disconnection and removal of the soaker hose 60 from the biowall 12 for maintenance. Furthermore, the water connection point 56 is preferably equipped with a valve which allows for the ability to selectively shut down water flow at each tier if a tray 16 is displaced. In addition, the modularized design of the trays 16 allows for watering system changes with the change of a tray 16. In case of overwatering of the plants, the air chambers 22 underneath the trays 16 and the drain trays 34 at the back of the plenum 12 are able to collect the surplus water and conduct it to the main drain 48, which may be connected to a drainage line within the building plumbing system. Hence, the whole watering system is preferably a one-way system which does not recycle water to prevent clogging the soaker hoses 60. However, it is foreseeable that the drainage water could be filtered and returned to the watering system.

Figure 9:
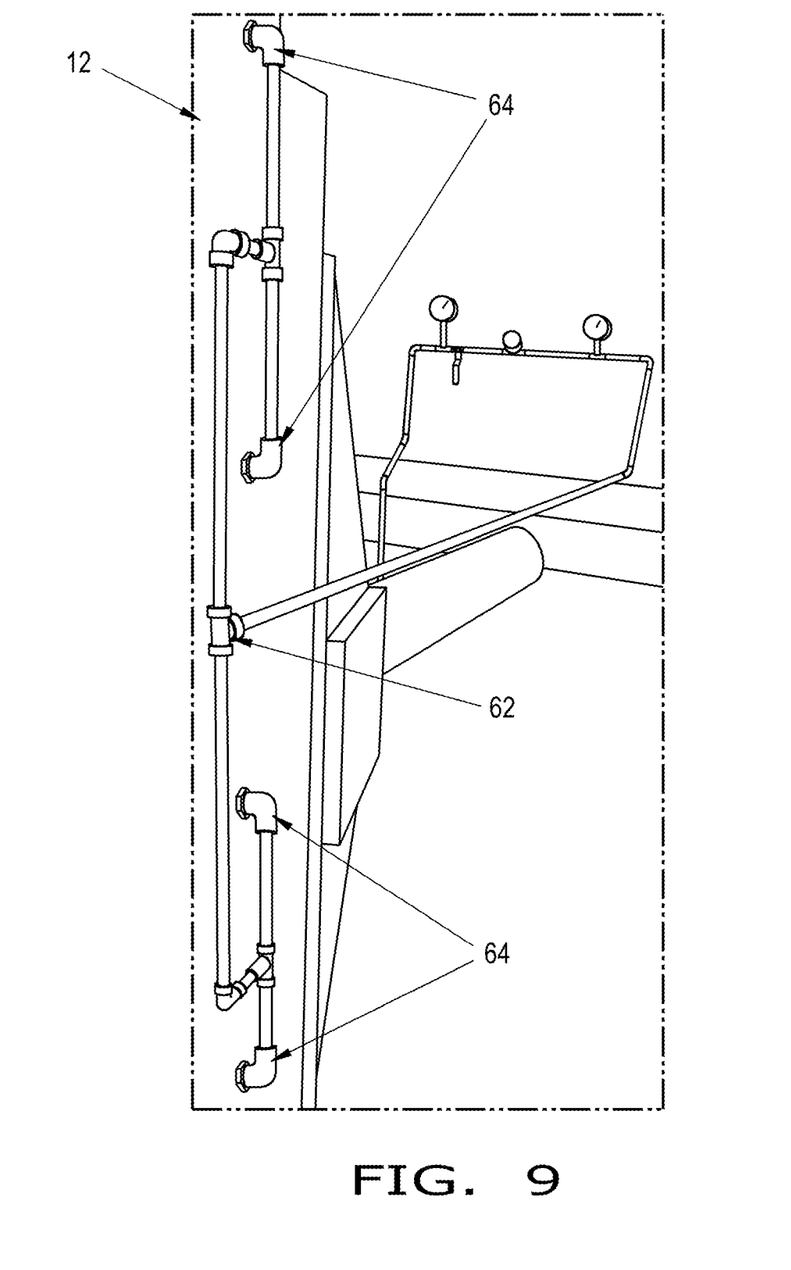
FIG. 9 represents a piping system for providing water to the biowall of FIG. 2.

FIG. 9 displays an exemplary piping system for providing water to the plenum 12. Water from a water source enters the piping system of the biowall 10 at a common inlet point 62. Preferably, equal amounts of water flow from the common inlet point 62 to individual inlet points 64, one for each tray tier, which are attached to the water connection points 56. It is foreseeable that the piping system may be hidden from view from living spaces within a house but accessible from a closet or utility area behind the backduct 14.

As represented in FIG. 7, the plenum 12 includes light sources 54, for example, LED grow light strips, which may be equally spaced above each tray 16. The light sources 54 preferably emit wavelengths which support photosynthesis and have a natural white color.

Preferably, the botanical air filtration system comprises various controls for operating the system and maintaining the health and growth of the plants. As previously mentioned, the system maybe integrated into a building's HVAC system in order to remove contaminants from, for example, the return air. In order to improve the integration of the botanical air filtration system into the HVAC system, the botanical air filtration system may include controls for operating the HVAC system of the building and/or the HVAC system may include controls for operating the botanical air filtration system. The botanical air filtration system may include a water control system for controlling watering of the plants. Such control system may be configured to provide water to the plants, and control the relative humidity within the biowall 10, and reduce or minimize the impact of the irrigation system on the relative humidity of the air within the building. A light control system may be included to control the light sources 54, and may be configured to adjust light output based on health of the plants, preferences of residents of the building, and energy use of the lighting system. An airflow control system is preferably included for controlling the air moving through the botanical air filtration system. Such control system may be configured to adjust air flow, for example, by adjusting the fan speed and/or position of slide gates 32, based on factors such as air quality, pressure within the botanical air filtration system, and the health of the plants.

Figure 10:
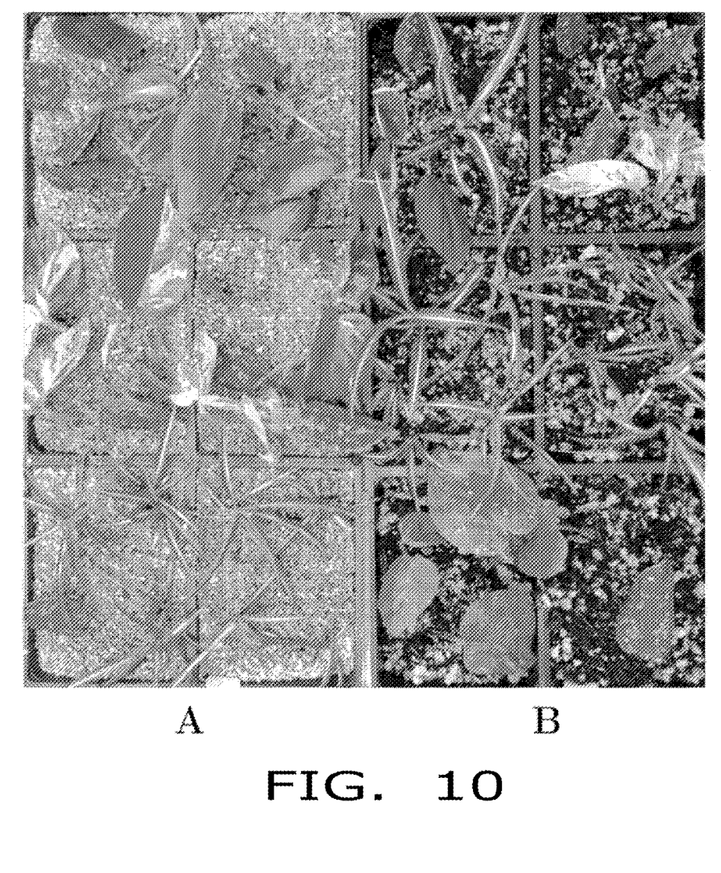
FIG. 10 represents nonlimiting plants of types that may be grown in the biowall of FIG. 2.

Various types of plants may be used in the biowall 10. In investigations leading to the present invention, three different plant types were used in the biowall 10: *Epipremnum aureum* (Golden Pothos), *Chlorophytum comosum* (Spider Plant), and *Philodendron scandens* (Heartleaf *Philodendron*). These plants were chosen for their air-cleaning potential and resistance to changing environmental conditions. The plants were raised in the growth media 58 itself instead of soil. After taking plant cuttings from a mother plant, the cuttings were initially potted into vermiculite (side A in FIG. 10), a loose mineral growing mix which allows the plants to establish roots. A root hormone was added to boost root growth. The plants stayed in the vermiculite for 1-2 weeks under high watering conditions before they were potted to a growth media mix of 50% coco coir (fiber growing media) and 50% Growstone® GS-2 (soil aerator).

After 2-3 months in the growth media mix, the plants were moved into the biowall 10. Based on the investigations, a particularly suitable growth media composition may include 40% coco coir, 40% Growstone GS-2, and 20% activated carbon pellets (Acurel® Extreme Activated Carbon Pellets). The activated carbon pellets are commonly used to capture pollutants from the air for later degradation by microorganisms. In the biowall 10, this function may help to compensate peak concentrations of pollutant and provide a more constant pollutant feed to the microbial community.

Figure 11:
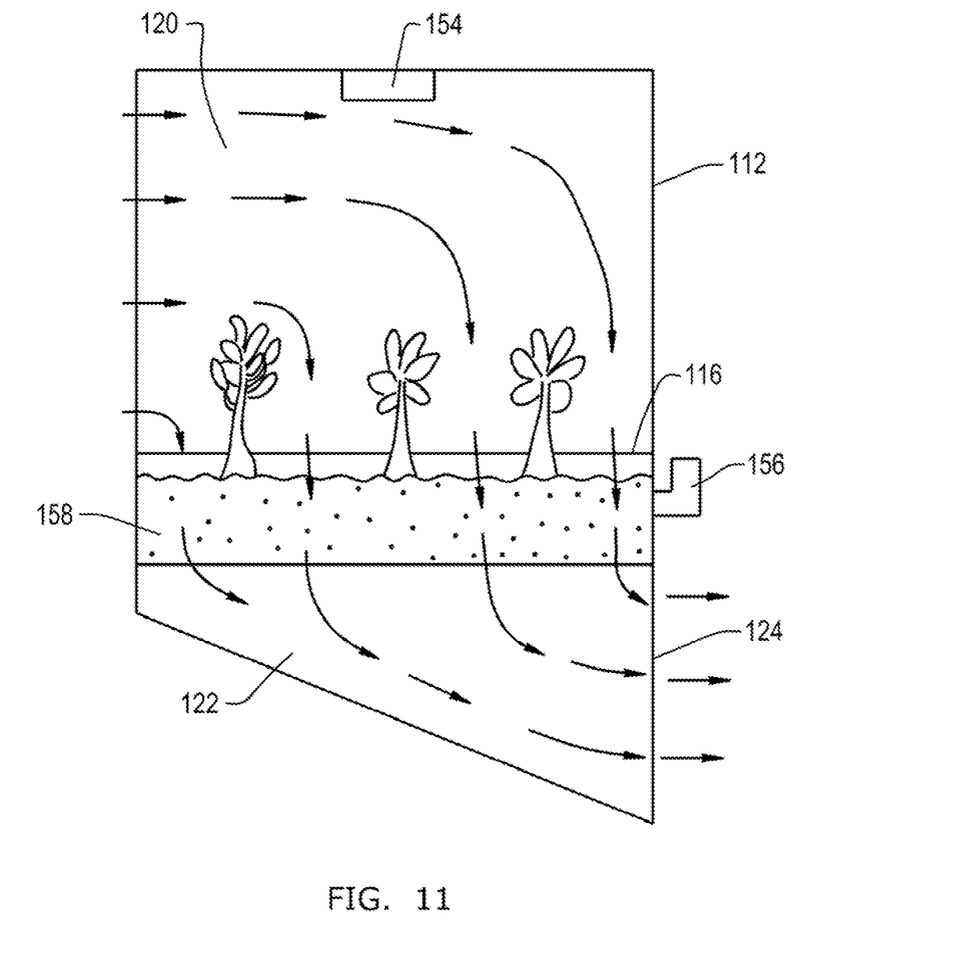
FIG. 11 schematically represents a botanical air filtration system in accordance with a second nonlimiting embodiment of the invention.

FIG. 11 is a cross-sectional side view that schematically represents another nonlimiting botanical air filtration system. As represented, this embodiment is similar in construction and operation to a single tray 16 (and its surrounding enclosure) from the biowall 10 of FIGS. 1 through 10. In this figure, reference numbers consistent with those used in reference to the embodiment of FIGS. 1 through 10 are used to identify the same or functionally equivalent elements, but with a numerical prefix (1) added to distinguish the particular embodiment from the embodiment of FIGS. 1 through 10. The system is configured such that air (represented with arrows) is drawn through a first opening in the a side of the enclosure 112 into a space 120 within the enclosure 112 such that the air travels laterally (horizontally) over and/or through the leaves of the plants, downwards through the growth media 158, into an air chamber 122, and then out of the enclosure 112 through a second opening 124. The system includes means of providing the plants with light (e.g., light source 154 and corresponding controls) and water (e.g., water connection point 156, soaker hose (not shown), and corresponding controls), and includes means for controlling the movement of the air relative to the plants and growth media (e.g., fan, hole pattern in tray, slide gates (not shown), and corresponding controls). These means can be accomplished in substantially the same manner as previously described in relation to the embodiment of FIGS. 1 through 10. Preferably, the plants and growth media 158 are contained within a removable tray 116 to provide convenient access to the plants. Preferably, the air drawn into the enclosure 112 travels horizontally and vertically through the growth media 158. The embodiment of FIG. 11 may be used in various applications. For example, the enclosure 112 may be incorporated into a relatively small standalone device configured to filter and/or affect the relative humidity of a room. In such an example, the conditioned air expelled from the second opening 124 may be released or forced into the same room from which the air was originally drawn into the first opening. Alternatively, the enclosure 112 may be incorporated into a relatively large system wherein the conditioned air passing through the second opening 124 is transported to another portion of the system.

While the invention has been described in terms of a specific or particular embodiment and investigations, it is apparent that other forms could be adopted by one skilled in the art. For example, the biowall and its components could differ in appearance and construction from the embodiment described herein and shown in the drawings, functions of certain components of the biowall could be performed by components of different construction but capable of a similar (though not necessarily equivalent) function, and various materials could be used in the manufacturing of the biowall and its components. In addition, the invention encompasses additional or alternative embodiments in which one or more features or aspects of the different disclosed embodiments may be combined. Accordingly, it should be understood that the invention is not limited to any embodiment described herein, illustrated in the drawings, or disclosed in the attached document. It should also be understood that the phraseology and terminology employed above are for the purpose of describing the disclosed embodiment and investigations, and do not necessarily serve as limitations to the scope of the invention. Therefore, the scope of the invention is to be limited only by the following claims.

The invention claimed is:

1. A botanical air filtration system comprising:
an enclosure;
a wall within the enclosure;
two or more horizontal plant beds on which living plants are supported and grow within the enclosure, the plant beds being arranged in vertical tiers along the wall, each of the plant beds comprising a growth media and a tray that contains the growth media, each of the trays having a bottom surface that supports the growth media and holes in the bottom surface through which air moving through the plant bed is able to flow downwardly through the growth media and then exit the plant bed through the bottom surface of the tray;
an airflow pattern within the enclosure wherein air moving through the enclosure flows horizontally across each of the plant beds from a front of the tray thereof to a back of the tray thereof, over and through leaves of the plants of the plant beds, then downwardly through the growth media, then downwardly through the holes in the bottom surface of the tray, and then out of the enclosure, the holes in the bottom surface of each of the trays defining a hole pattern that promotes a uniform air flow across the tray;
an irrigation system for watering the plants; and
a lighting system for simulating sunlight.

2. The botanical air filtration system of claim 1, wherein the enclosure comprises a backduct and each of the plant beds further comprises an air chamber beneath the bottom surface thereof that receives the air flowing downwardly through the bottom surface and then guides the air to an individual air chamber outlet through which the air passes and enters the backduct.

3. The botanical air filtration system of claim 2, the system further comprising gates located at the air chamber outlets and adapted for adjusting the airflow between the trays.

4. The botanical air filtration system of claim 1, wherein the holes have diameters that decrease from the front to the back of each of the trays.

5. The botanical air filtration system of claim 1, wherein each of the trays is removable from the vertical tiers and maintains an air tight seal around a base of the tray.

6. The botanical air filtration system of claim 1, wherein the air moving through the enclosure is supplied to an HVAC system of a building so that return air from the building is drawn through the enclosure to remove pollutants with the plants.

7. The botanical air filtration system of claim 6, wherein the air that has passed through the enclosure is combined with outdoor ventilation air before being recirculated throughout the building.

8. The botanical air filtration system of claim 6, further comprising means for controlling the HVAC system of the building and/or means for controlling the botanical air filtration system with the HVAC system of the building.

9. The botanical air filtration system of claim 1, further comprising means for controlling a dehumidification system and/or a humidification system used in combination with the botanical air filtration system to take into consideration a humidification effect of the botanical air filtration system.

10. The botanical air filtration system of claim 1, further comprising a water control system for controlling the irrigation system and an impact of the irrigation system on the relative humidity of the building.

11. The botanical air filtration system of claim 1, further comprising a light control system for controlling the lighting system, and adjusting light output based on health of the plants, preferences of residents of the building, and energy use of the lighting system.

12. The botanical air filtration system of claim 1, further comprising an air flow control system for controlling the air moving through the vertical tiers and the enclosure, and adjusting air flow based on air quality, pressure within the botanical air filtration system, and health of the plants.

13. A method of using a botanical air filtration system, the method comprising:
drawing air through an enclosure of the botanical air filtration system, the enclosure having a wall within the enclosure and two or more horizontal plant beds on which living plants are supported and grow within the enclosure, the plant beds being arranged in vertical tiers along the wall, each of the plant beds comprising a growth media and a tray that contains the growth media, each of the trays having a bottom surface that supports the growth media and holes in the bottom surface through which air moving through the plant bed is able to flow downwardly through the growth media and then exit the plant bed through the bottom surface of the tray;
wherein the air drawn through the enclosure defines an airflow pattern within the enclosure in which the air flows horizontally across each of the plant beds from a front of the tray thereof to a back of the tray thereof, over and through leaves of the plants of the plant beds, then downwardly through the growth media, then downwardly through the holes in the bottom surface of the tray, and then out of the enclosure, the holes in the bottom surface of each of the trays defining a hole pattern that promotes a uniform air flow across the tray;

watering the plants with an irrigation system of the botanical air filtration system; and simulating sunlight for the plants with a lighting system of botanical air filtration system.

14. The method of claim 13, wherein the enclosure comprises a backduct and each of the plant beds further comprises an air chamber beneath the bottom surface thereof that receives the air flowing downwardly through the bottom surface and then guides the air to an individual air chamber outlet through which the air passes and enters the backduct, the method further comprising adjusting gates located at the air chamber outlets to adjust the airflow between the plant beds.

15. The method of claim 13, further comprising integrating the enclosure with an HVAC system of a building so that return air from the building is drawn through the enclosure to remove pollutants with the plants.

16. The method of claim 13, further comprising combining outdoor ventilation air with the air that has passed through the enclosure and then recirculating the combined air throughout the building.

17. The method of claim 16, further comprising controlling the HVAC system of the building with the botanical air filtration system and/or controlling the botanical air filtration system with the HVAC system of the building.

18. The method of claim 13, further comprising controlling a dehumidification system and/or a humidification system used in combination with the botanical air filtration system to take into consideration a humidification effect of the botanical air filtration system.

19. The method of claim 13, further comprising controlling the irrigation system and an impact of the irrigation system on the relative humidity of the building with a water control system of the botanical air filtration system.

20. The method of claim 13, further comprising controlling the lighting system and adjusting light output based on health of the plants, preferences of residents of the building, and energy use of the lighting system with a light control system of the botanical air filtration system, and controlling the air moving through the vertical tiers and the enclosure and adjusting air flow based on air quality, pressure within the botanical air filtration system and health of the plants with an air flow control system of the botanical air filtration system.

* * * * *